INVENTORS
MADHUKAR L. JOSHI
ALAN PLATT
EDWARD S. WAJDA
BY Melvyn D. Silver
AGENT March 14, 1972 M. L. JOSHI ET AL 3,649,388

METHOD FOR MAKING A SEMICONDUCTOR DEVICE HAVING A SHALLOW, FLAT FRONT DIFFUSION LAYER

Filed Nov. 4, 1968 3 Sheets-Sheet 2

FIG. 8

TABLE I

| WAFER NUMBER | 5 min PREHEAT IN $O_2/N_2$ | | $\rho_s$ (Ω/□) | $x_j$ (MILS) | $C_0$ (AT/CC) ASSUME Erfc |
|---|---|---|---|---|---|
| | TEMP °C | % $O_2$ | | | |
| A 1 $POCl_3$ | 970 | ≃12 | 3739 | 0.0069 | $8.0\times10^{17}$ |
| A 2 $POCl_3$ | | | 2750 | 0.0145 | $3.2\times10^{17}$ |
| B 5 $PH_3$ | 885 | ≃0.75 | 168 | 0.0273 | $1.0\times10^{19}$ |
| B 6 $PH_3$ | | | 154 | 0.0314 | $1.15\times10^{19}$ |
| C 9 | | | 2.3 | 0.119 | $1.17\times10^{21}$ |
| C 10 | | | 2.3 | 0.120 | $1.16\times10^{21}$ |

FIG. 9

TABLE II

TOTAL FLOW 4 LITRES/min

| $POCl_3$ SYSTEM DEPOSITION ONLY | | | | PPM/$POCl_3$ | | | | | |
|---|---|---|---|---|---|---|---|---|---|
| | | | | 300 | 600 | 800 | 1000 | ≈4000 | ≈5000 |
| PRE-HEAT | DIFFUSION 970°C | COOL | | | | | | | |
| min 5 Ar | min 30 Ar/8%$O_2$ + $POCl_3$ | min 5 Ar | $\rho_s$ Ω/□ | 12.8 | 11.5 | 8.5 | 8.6 | 6.7 | 6.3 |
| | | | (BEVEL / STAIN METHOD) $x_j$ μ INCHES | 43.4 | 40.6 | 38.1 | 38.7 | 38.0 | 36.7 |
| | | | COMPLEMENTARY $C_0$ ERROR FUNCTION NO/CC | $4.2\times10^{20}$ | $6\times10^{20}$ | $1.2\times10^{21}$ | $1.5\times10^{21}$ | $2\times10^{21}$ | $2.2\times10^{21}$ |
| min 5 $N_2/O_2$ | min 30 $N_2/O_2$ + $POCl_3$ | min 5 $N_2/O_2$ | $\rho_s$ Ω/□ | 13.8 | 12.7 | 9.47 | 8.74 | 7.0 | 7.2 |
| | | | (BEVEL / STAIN METHOD) $x_j$ μ INCHES | ≈33.2 | ≈37.2 | ≈38.1 | ≈39.1 | 43.2 | 44.2 |
| | | | COMPLEMENTARY $C_0$ ERROR FUNCTION NO/CC | $4.5\times10^{20}$ | $5.6\times10^{20}$ | $8\times10^{20}$ | $9.5\times10^{20}$ | $1.14\times10^{21}$ | $1.5\times10^{21}$ |

United States Patent Office
3,649,388
Patented Mar. 14, 1972

3,649,388
METHOD FOR MAKING A SEMICONDUCTOR DEVICE HAVING A SHALLOW, FLAT FRONT DIFFUSION LAYER

Madhukar L. Joshi, Essex Center, Vt., and Alan Platt, La Grangeville, and Edward S. Wajda, Poughkeepsie, N.Y., assignors to International Business Machines Corporation, Armonk, N.Y.

Filed Nov. 4, 1968, Ser. No. 772,983
Int. Cl. H01l 7/44
U.S. Cl. 148—189 2 Claims

ABSTRACT OF THE DISCLOSURE

A method of concurrently forming a shallow, flat front diffusion layer and a high surface impurity concentration in a semiconductor wafer, by preheating the wafer to diffusion temperature in an atmosphere that will not form any film, such as an oxide or nitride layer, upon the surface of the semiconductor wafer; carrying the diffusant, such as As or P, in a carrier gas such as argon that will not interfere by layer formation with the diffusion; diffusing the As or P to a depth not exceeding 20 microinches; and then cooling in an inert atmosphere.

FIELD OF THE INVENTION

Process for deliberately adding an impurity into a starting material, characterized by a diffusion of such impurity from a gaseous, liquid, or solid state into a solid starting material; typically the impurity is a "donor" or "acceptor" type diffused into a semiconductor material.

BACKGROUND OF THE INVENTION

Semiconductor devices are often made by either of two common methods, open tube diffusion or closed tube diffusion. Requirements for faster semiconductor devices require stringent control of impurity diffusions. Difficulties with these past methods, particularly with control of impurity profiles, has been avoided by utilizing semiconductor devices having the impurity dopants deeply diffused into the wafer, to an extent where kinked profiles no longer affect device operations. These diffusions are well in excess of 30 microinches deep. Certain types of semiconductor devices require, however, for speed and size limitation, that the impurity depth be limited to 20 microinches or less from the surface of the semiconductor material.

Where high surface impurity concentrations are concurrently desired with a shallow diffusion depth, process control becomes critical. Current open tube diffusion processes have not been designed for shallow diffusions. For example, it is often that an "inert" gas such as nitrogen will be used as the carrier gas. Process controls in general have dealt with impurity concentrations, uniform heating, and heat cycling.

While current processes are adequate for deep diffusions, they are by themselves insufficient when shallow diffusions are needed, where such shallow diffusions concurrently require a flat front and a high surface impurity concentration.

Thus, an object of this invention is accurately controlling the diffusion profile of an impurity in a semiconductor wafer by controlling the surface-gas interaction during open tube diffusion.

Another object is to obtain a shallow, flat front diffusion profile of an impurity in a semiconductor wafer.

Still another object is to concurrently obtain a desired high surface impurity concentration and a shallow, flat front diffusion profile within a depth of 20 microinches in a semiconductor wafer in an open tube diffusion process.

SUMMARY

These and other objects are met by the method of this invention. Briefly, a semiconductor wafer, such as silicon, is placed in an open tube diffusion apparatus, and preheated to an impurity diffusion temperature in an atmosphere that will prevent the formation of a film layer upon the semiconductor surface. Next, an impurity, such as phosphorus, is introduced into a filmless carrier gas and carried to the semiconductor wafer being held at the diffusion temperature, where diffusion occurs. A filmless carrier gas is defined as one that prevents the formation of a diffusion-impeding film upon a semiconductor wafer surface, and may also remove any film previously formed upon such surface. The diffusion is maintained until a maximum depth of 20 microinches is obtained, and the wafer cooled in an atmosphere of such filmless carrier gas, free of the impurity. The resulting wafer is characterized by having a shallow, flat front diffusion profile and a high surface impurity concentration.

While one embodiment of the process of this invention has been briefly outlined, the invention will best be understood when read in relation to the accompanying drawings and general description.

Figure 2:
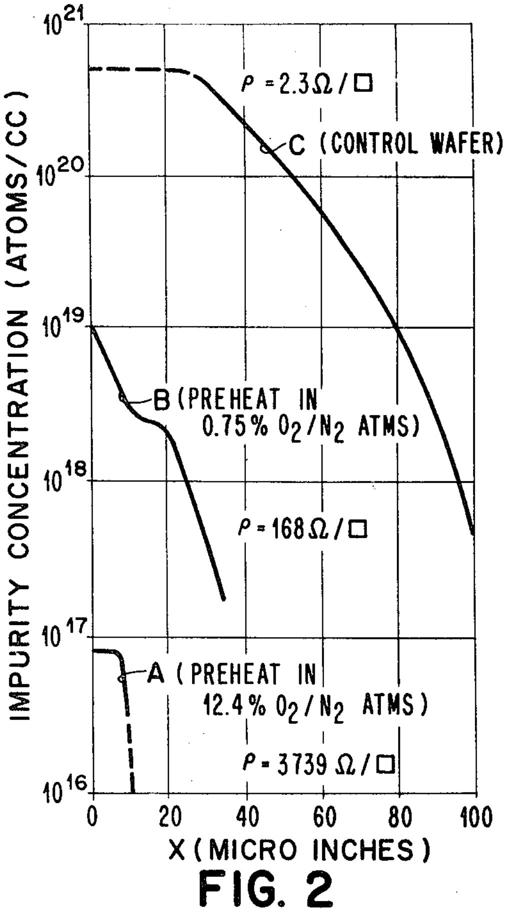
FIG. 2 shows a comparison of impurity concentration profiles from wafers gone only through preheat in a $POCl_3$ system and later diffused with P in a capsule.
Figure 3:
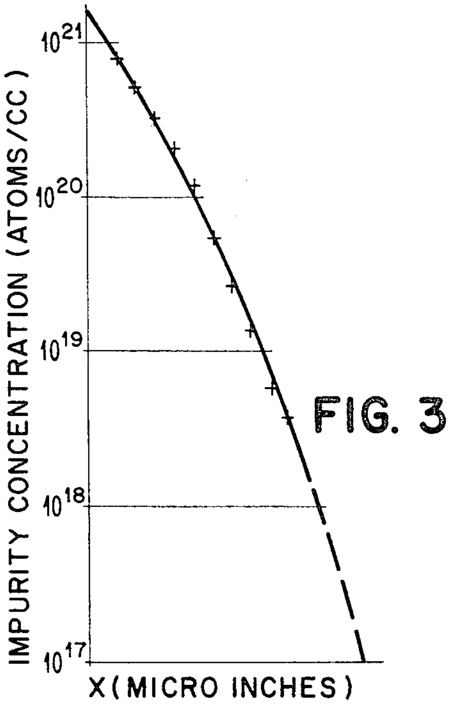
FIGS. 3–7 show various impurity concentration profiles of silicon wafer made by the standard $POCl_3$ diffusion method (FIGS. 4, 6) and by the method of this invention (FIGS. 3, 5, 7).

Table I shows the results of FIG. 2.

Table II shows test results comparing wafers made by the standard $POCl_3$ diffusion with nitrogen carrier gas, and by the method of this invention.

GENERAL DESCRIPTION

The current practice in an open tube diffusion process may be illustrated by an example of a phosphorus diffusion into a silicon semiconductor wafer. While it will be clear that the problems, and solutions thereto, are not limited to a phosphorus-silicon system, this system is used for clarity of illustration.

The commonly practiced $POCl_3$ diffusion process consists of a three stage cycle, using an inert carrier gas and $O_2$ for effecting the decomposition of $POCl_3$. The cycle, designated by $x/y/z(POCl_3)$ is comprised of:

*x*-Preheat step

This step is used for preheating the silicon wafer to diffusion temperature without the presence of the diffusant impurity. This is usually done in a nitrogen ambient atmosphere for economic reasons. The starting wafer has generally been precleaned to remove surface contaminants, by mechanical or chemical methods well known in the art, and has generally also been lapped or cut to a desired thickness.

*y*-Diffusion

While maintaining the wafer at the diffusion temperature, $POCl_3$ and $O_2$ are introduced into a carrier gas to effect the phosphorus diffusion. This is done by passing the nitrogen carrier gas over a source that generates $POCl_3$, adding $O_2$ to the gas, and passing the mixture over the wafer held at the diffusion temperature. The $O_2$ is required for reaction with the $POCl_3$ to form a phosphosilicate glass on the wafer surface, which glass acts as the diffusion source.

*z*-Post-anneal

This is to allow the system to settle when the $POCl_3$ gas is being withdrawn. The step achieves a steady state condition before the withdrawal of diffused silicon wafers and helps process control. This also avoids thermal shocks.

For ease of operation, oxygen, in a range of 1–30%, is usually admitted during the preheat cycle and left on for the remainder of the processing.

While the prior art has considered nitrogen as an inert carrier gas, we have established that the use of $N_2$ as the carrier gas in the $POCl_3$ system introduces a surface barrier or film upon the wafer surface, of about 75 to 100 A. in thickness, *during the preheat cycle* (*x*-cycle). This surface barrier or film is $Si_xN_yO_2$, most probably rich in $Si_xN_y$. Such a film acts as a barrier to impede the subsequent flow of diffusant during the diffusion step (*y*-cycle), and results in lower attainable surface concentrations while also causing anomalous diffused impurity distributions (profiles with kinks) discussed later.

For device structures, where the diffused junctions were made under such conditions and where the junctions are "deep" ($X_j > 25\mu''$), the device characteristics are not strongly influenced by the profile anomalies. However, in making shallow emitter junction structures ($X_j < 25\mu''$), which are required for high performance devices, fine structure profile anomalies, manifested by the diffusion process procedure, seriously affect speed, capacitance, etc., through the impurity concentration gradient at the junction. These profile anomalies are serious, and are demonstrated as follows.

A replacement of the not-so-inert gas $N_2$ by the truly inert gas Ar or He in the preheat cycle, has shown that the surface barrier is not created, that the effective surface impurity concentration is increased, and that the diffused impurity profile anomalies are eliminated.

A typical set of operating conditions for a 2-inch diameter silicon wafer is as follows, utilizing a truly inert gas:

Preheat cycle—
- Time: 5 minutes
- Ambient: Ar or He
- Temperature: Room to diffusion temperature for the selected impurity, typically 800–1100° C. for silicon, 650–900° C. for germanium.

Diffusion cycle—
- Time: Sufficient in conjunction with the chosen diffusion temperature to limit diffusion depth to $<20\mu''$ ($X_j < 20\mu''$).
- Ambient: Ar or He, $+(POCl_3+O_2)$
- Temperature: 850–1000° C. for silicon, 650–900° C. for germanium.

Cooling cycle—
- Time: 5 minutes
- Ambient: Ar or He
- Temperature: Diffusion temperature down to room temperature.

Figure 1:
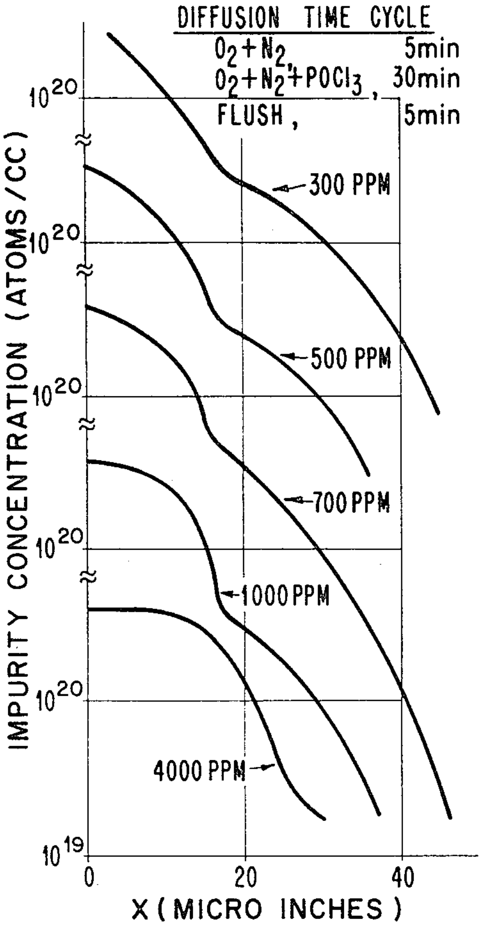
FIG. 1 shows the impurity concentration profiles of a series of silicon wafers run in a standard $POCl_3$ diffusion method with nitrogen carrier gas.

FIG. 1 shows phosphorus distribution profiles for wafers made utilizing nitrogen gas, measured electrically by the well-known anodic sectioning/differential conductance method. The diffusion process is the standard $POCl_3$ cycle (5 minutes preheat in $O_2/N_2$; 30 minutes diffusion in $O_2/N_2/POCl_3$; 5 minutes flush in $O_2/N_2$) at 970° C. diffusion temperature with varying $POCl_3$ concentrations from 300 to 4000 p.p.m. A kink in the profiles between 16–18$\mu''$ deep and $\sim 4\times10^{19}$ impurity atoms/cc. concentration is consistently observed. It was thought that these kinks might be caused by a retarding surface layer possibly created during the preheat period in the $O_2/N_2$ atmosphere, by the presumably inert $N_2$ carrier gas and oxygen in combination reacting with the silicon wafer. This was confirmed.

Wafers A (Table I), processed through only the preheat period in $POCl_3$ system and those, B, processed through only the preheat period in $PH_3$ system were run together along with standard test wafers, also called control wafers C in a phosphorus capsule. Wafers C received no preheat treatment at all. The source concentration was $\sim 10^{21}$ atoms/cc. and the temperature was 1108° C., for 12½ hours.

Table I shows the results in terms of $\rho_s$ (ohm/sq.), the sheet resistance, which is a measurement of the conductivity of the diffused region; $X_j$, the depth of diffusion, in mils; erfc $C_0$, the surface concentration in atoms/cc., determined from the $\rho_s$ and $X_j$ measurement assuming an error function distribution; and the percent of oxygen present during each test run. The test wafers were all 1 ohm-cm. p-type silicon wafers. Note the greater $X_j$ and $C_0$ for wafer C where no preheat cycle was used, and thus no opportunity for a barrier film to form.

FIG. 2 shows the electrical profiles for the wafers. These results show the existence of barrier formation in both the $POCl_3$ and $PH_3$ systems during the preheat period. The barrier formation in the $PH_3$ preheat which also uses $N_2$ as a carrier gas is illustrated by means of wafer B and is less severe than that in the $POCl_3$ preheat (wafer A). The barrier for wafer A was so severe that very little penetration into the wafer was observed under the diffusing conditions. The differences in $PH_3$ and $POCl_3$ systems are due to different $O_2$ content in the flow.

The major difference between the $PH_3$ and $POCl_3$ systems shown is the nature of the *nitride barrier containing different oxygen contents*. During $POCl_3$ entrance in the system, the barrier starts crumbling, i.e., gets converted into phosphate glass. The rapidness with which this will happen will depend on the oxygen content in the carrier gas.

Transmission, and also reflection, electron microscopy has confirmed that a barrier, giving diffraction rings almost similar to those obtainable from pure $Si_3N_4$, exists on the samples A, B, processed through the preheat period. Barriers on test wafers C were only vanishingly present.

By replacing the nitrogen carrier gas by argon, with no oxygen flow during the preheat period, and using the same 5/30/5 $POCl_3$ cycle with the same amount of $O_2$ during the actual diffusion and flush period, barrier effects are minimized. Results indicate any remaining kinks are very small and $C_0=10^{21}$ atoms/cc. is obtained for a concentration of $POCl_3$ as small as 800 p.p.m. We also observe decreasing junction depth throughout the $POCl_3$ concentration range. The results are then significantly different that those previously reported by various researchers in the field of $POCl_3$ diffusion. Table II gives the results obtained with argon as the carrier gas and also those obtained using the usual $N_2/O_2$ system. $\rho_s$, $X_j$, and $C_0$ are the same entities as shown with Table I.

The $X_j$ measurement starts at 43.4 for the argon system, decreasing to 36.7. This shows the absence of a barrier film in the surface, allowing rapid diffusion depth, to a point where solid solubility of P in Si is reached, with subsequent precipitation, reflected in the lessening $X_j$ depth as $POCl_3$ concentration is increased. Where nitrogen is used, the presence of an initial barrier film prevents such initial depth of diffusion and phosphorus build-up, shown by increasing $X_j$ depth as $POCl_3$ concentration is increased. Further, the absence of a film in the argon system also results in higher $C_0$ values than with the nitrogen system, as well as lower $\rho_s$ values.

Figure 4:
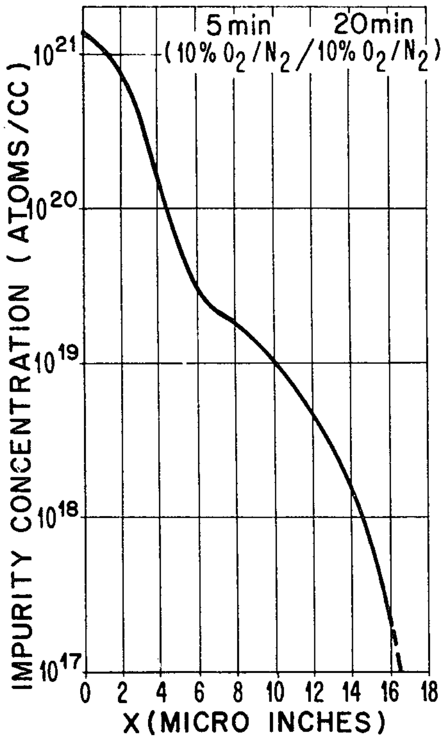
Figure 5:
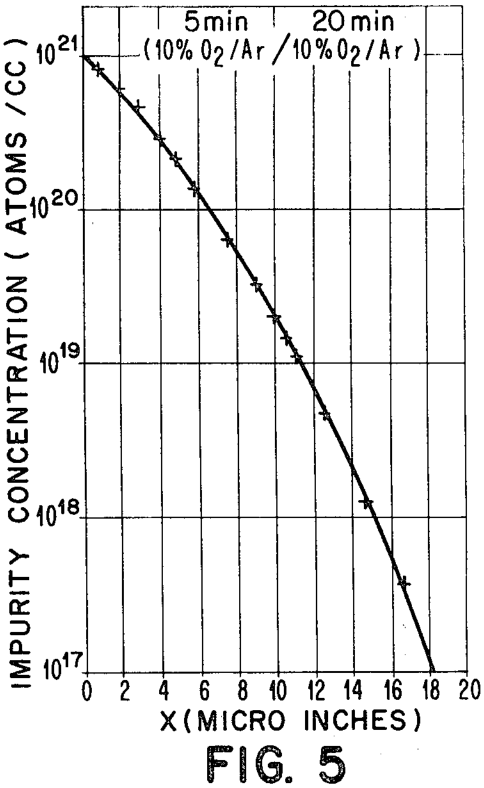
Figure 6:
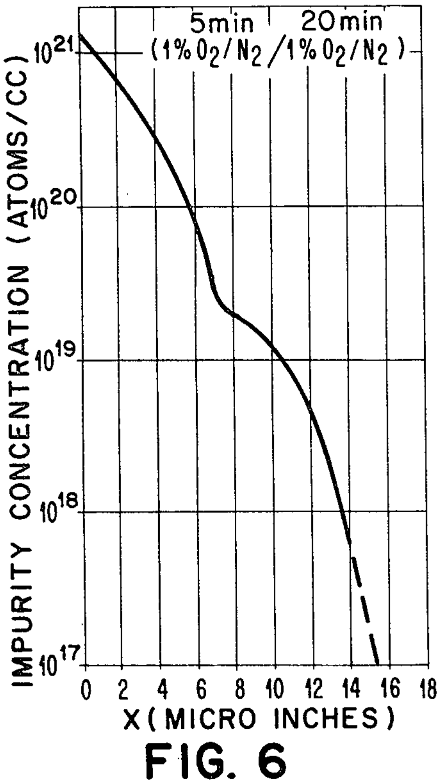
Figure 7:
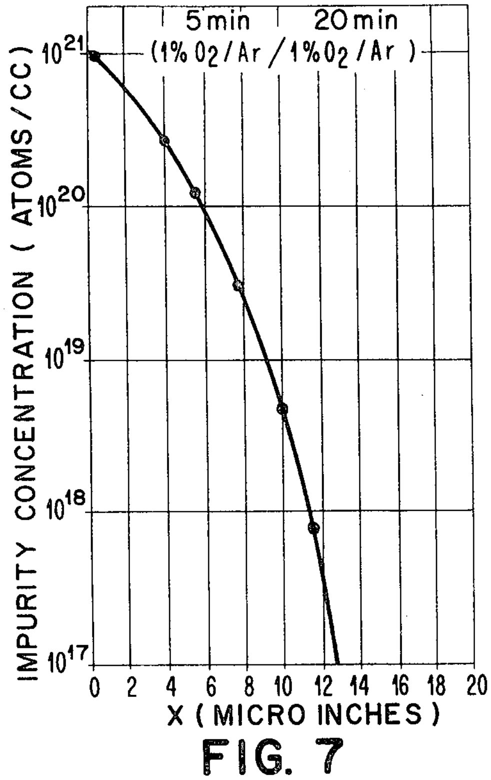

FIGS. 3–7 show the effects of varying $O_2$ content on the profiles. Wherever the surface film discussed above is formed, the "kink" is also formed. Thus, kinks are shown in FIGS. 4 and 6, while none are evident in FIGS. 3, 5, and 7.

Thus, we have discovered that certain carrier gases, previously believed to be inert, actually form a diffusion impeding film upon the surface of the semi-conductor wafer. While this has only a small effect upon deep diffusions, diffusions requiring a shallow (i.e., 6–20 micro-inches) flat front diffusion profile, made with such gases are unacceptable. It is essential that the gas used be a "filmless carrier gas," such gas defined as one that prevents the formation of a diffusion impeding film upon the surface of the semiconductor wafer during the preheat or diffusion cycle, or that will remove any film formed on the surface of the wafer during the preheat cycle. Such a gas is preferably argon or helium, but if a preheat film is present, a gas such as HCl or chlorine, or hydrogen, or any gas that will prevent the formation of a film while still allowing diffusion to occur, is acceptable.

Concurrent with the forming of a shallow, flat front diffusion profile, high surface impurity concentrations are achieved during the same diffusion.

While the discussion above has shown the effect upon silicon by a diffusion impeding film, in conjunction with the phosphorus diffusion method, and improvement with an argon or helium carrier gas, this invention is not limited to such materials. A phosphorus or arsenic diffusion is possible in silicon or germanium, or other semiconductor material, choosing a diffusion temperature compatible with the impurity to be diffused. It is, of course, essential that the melting point of the materials not be exceeded, and the impurities chosen be compatible with the wafer material. Other inert or filmless carrier gases may also be utilized.

The previous tables and figures show the effect of varying amounts of oxygen in the preheat gas, and the effect of nitrogen in the preheat gas, as well as during the diffusion cycle. Uniformly, the resutls have shown the problems attendant with the use of a film-forming gas such as nitrogen. Most impressive is the absence of a kink in the profiles when a filmless carrier gas is utilized.

Cooling times and heating times will now be discussed. The heating time from room temperature to diffusion temperature will obviously depend upon the thickness of the wafer and the means available for heating. Cooling times will be similarly affected. The primary concern in both heating and cooling cycles is that the heating or cooling time to diffusion temperature and from diffusion temperature be chosen so as to avoid the formation of internal stresses in the wafer that will cause the cracking of the wafer. Upon completion of a diffusion cycle, it is, of course, desirable to reduce temperature from the diffusion temperature to one below which diffusion of the impurity ceases or becomes insignificant in the quickest possible time. The maximum heating and cooling times are readily calculable from known diffusion constants of impurities in silicon and germanium as a function of temperature, as is well known in the art. Stress pattern formation within such materials as a function of size and configuration, time and temperature of heating, are also well known in the art.

Thus, in sum, we have discovered that to form a shallow, flat front diffusion profile in a semiconductor wafer while also forming a high surface impurity concentration in the wafer, it is necessary to carefully control the depth of diffusion and the gases used in the open tube diffusion process. By so doing, a control not before achieved in the manufacture of semiconductor devices is obtained.

While the invention has been particularly described and shown with reference to preferred embodiments thereof, it will be understood by those skilled in the art that various changes in form and details may be made therein without departing from the spirit and scope of the invention.

What is claimed is:

1. A method of eliminating non-uniform diffusion profiles in the doping of germanium semiconductor wafers with arsenic or phosphorus impurities, said impurities not exceeding 20 microinches in depth, and comprising the steps of:

preheatng the germanium semiconductor wafer to temperatures between 650°–900° C.;

diffusing the vapors of arsenic or phosphorus into said wafer by means of an inert filmless carrier gas consisting of either argon or helium while maintaining said wafer at said preheating temperature for a time sufficient to permit said impurities to diffuse into said wafer to the desired depth, not exceeding 20 microinches;

terminating diffusion at said depth by terminating the flow of said impurities vapors into said filmless carrier gas and then cooling said wafer to room temperature in the filmless carrier gas atmosphere.

2. A method of eliminating non-uniform diffusion profile in the doping of silicon semiconductor wafers with arsenic or phosphorus impurities said impurity not exceeding 20 microinches in depth and comprising the steps of:

preheating the silicon semiconductor to temperatures between 800°–1100° C.;

diffusing the vapors of arsenic or phosphorus into said wafer by means of an inert filmless carrier gas consisting of either argon or helium while maintaining said wafer at said preheating temperature for a time sufficient to permit said impurities to diffuse into said wafer to a desired depth not exceeding 20 microinches;

terminating diffusion at said depth by terminating the flow of said impurity vapors into said filmless carrier gas and then cooling said wafer to room temperature in the pure carrier gas atmosphere.

References Cited

UNITED STATES PATENTS

| | | | |
|---|---|---|---|
| 2,979,429 | 4/1961 | Cornelison et al. | 148—189 |
| 3,007,816 | 11/1961 | McNamara | 148—189 |
| 3,066,052 | 11/1962 | Howard | 148—189 |
| 3,085,032 | 4/1963 | Fuller | 148—189 |
| 3,162,526 | 12/1964 | Vanik | 148—189 |
| 3,180,755 | 4/1965 | Reinitz | 148—189 |
| 3,205,102 | 9/1965 | McCaldin | 148—189 |
| 3,215,570 | 11/1965 | Andrews et al. | 148—189 |

L. DEWAYNE RUTLEDGE, Primary Examiner

J. M. DAVIS, Assistant Examiner